(12) United States Patent
Bergman

(10) Patent No.: US 10,691,113 B1
(45) Date of Patent: Jun. 23, 2020

(54) ROBOTIC PROCESS CONTROL SYSTEM

(71) Applicant: Anthony Bergman, New Port Richey, FL (US)

(72) Inventor: Anthony Bergman, New Port Richey, FL (US)

( * ) Notice: Subject to any disclaimer, the term of this patent is extended or adjusted under 35 U.S.C. 154(b) by 389 days.

(21) Appl. No.: 15/890,241

(22) Filed: Feb. 6, 2018

(51) Int. Cl.
*G06F 9/44* (2018.01)
*G05B 19/418* (2006.01)
*G05B 19/042* (2006.01)

(52) U.S. Cl.
CPC ... *G05B 19/41835* (2013.01); *G05B 19/0426* (2013.01); *G05B 2219/23252* (2013.01); *G05B 2219/23255* (2013.01)

(58) Field of Classification Search
CPC .......... G05B 19/41835; G05B 19/0426; G05B 2219/23255; G05B 2219/23252
USPC .................................................. 700/249, 250
See application file for complete search history.

(56) References Cited

U.S. PATENT DOCUMENTS

| | | | | |
|---|---|---|---|---|
| 6,233,545 | B1* | 5/2001 | Datig | G06N 3/004 704/2 |
| 10,052,769 | B2* | 8/2018 | Houssin | B25J 11/001 |
| 2004/0193322 | A1* | 9/2004 | Pirjanian | B25J 9/1656 700/259 |
| 2005/0005266 | A1* | 1/2005 | Datig | G06N 5/02 717/136 |
| 2012/0197436 | A1* | 8/2012 | Maisonnier | B25J 9/1656 700/250 |
| 2018/0345479 | A1* | 12/2018 | Martino | B25J 13/08 |

* cited by examiner

*Primary Examiner* — Masud Ahmed
(74) *Attorney, Agent, or Firm* — Gulf Coast Intellectual Property Group

(57) ABSTRACT

A robotic process control system that is operable to provide automation of at least one electromechanical device wherein the programming language of the present invention utilizes commands, rules and argument within a virtual environment to provide control of an electromechanical device. The present invention includes an object oriented methodology facilitated by the software thereof that defines three object types being an atom object type, a process object type and an event object type. The object types reside in a virtual environment hosted on a computing device that is operably coupled to the electromechanical device wherein the object types are representative of the electromechanical device or a portion thereof. The present invention utilizes a programming language that utilizes English language statements and further creates digitope data for all of the objects within the present invention. The methodology of the present invention examines spatial relations between all of the objects.

20 Claims, 11 Drawing Sheets

| Index (1-Max.) | First Variable | 2nd Variable | 3rd Var. | 4th Var. | 5...26th |
|---|---|---|---|---|---|
| 1 (Digitope) | A | B | C | D | E...Z |
| 2 | A | B | C | D | E...Z |
| 3 | A | B | C | D | E...Z |
| 4 | A | B | C | D | E...Z |
| 5...Max. | A | B | C | D | E...Z |

FIG. 4

| Variable(s) Name | Description of Usage | Variable Type |
|---|---|---|
| A through L | Unaffected | Any (V.text/string/int/num/float) |
| M | Security (Type, Key(s), etc.) | V.text |
| N | Features (#Possible, Binary $, #Used, Binary $) | V.text |
| O | Variables In/Out (#In, Binary $, #Out, Binary $) | V.text |
| P | States (#Max, State names) | V.text |
| Q through T | User's Title (4 text lines maximum) | V.text |
| U | Authority URL | V.text |
| V | Home filename | V.text |
| W | Actual filename | V.text |
| X | Object Group name | V.text |
| Y | Object name | V.text |
| Z | Object Type | V.text |

FIG. 5

| Variable(s) Name | Description of Usage | Variable Type |
|---|---|---|
| A through W | Unaffected | Any (V.text/string/int/num/float) |
| X | State last changed "from" | V.text |
| Y | State last changed "to" | V.text |
| Z | Current State name | V.text |

FIG. 6

| Variable(s) Name | Description of Usage | Variable Type |
|---|---|---|
| A through U | Unaffected | Any (V.text/string/int/num/float) |
| V | RCL version # | V.int |
| W | OS version # | V.int |
| X | OS name | V.text |
| Y | OS Access Level of Calling User | V.int |
| Z | Julian DATE/TIME when current VENV session began | V.int |

FIG. 7

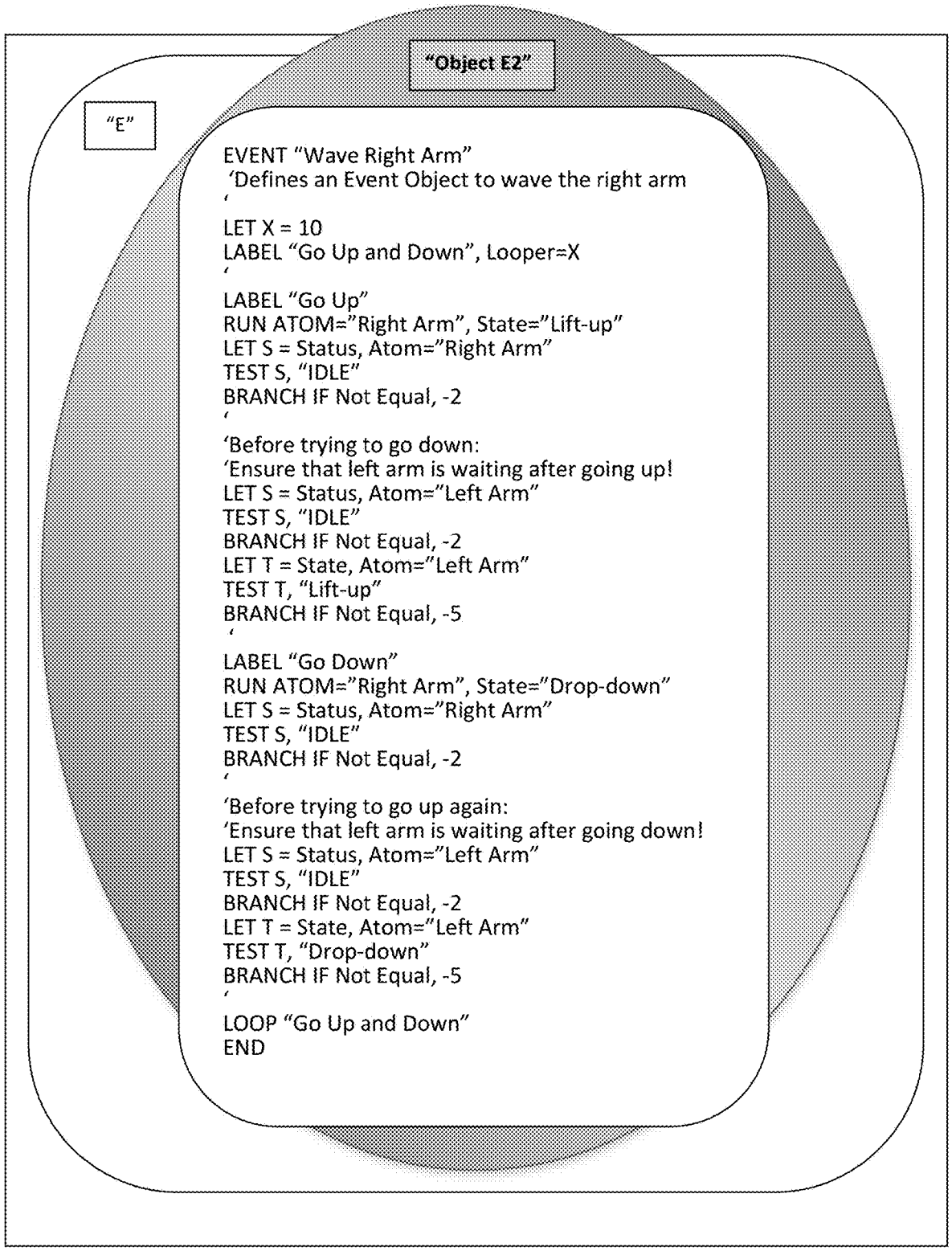

```
"Object E2"

EVENT "Wave Right Arm"
'Defines an Event Object to wave the right arm
'
LET X = 10
LABEL "Go Up and Down", Looper=X
'
LABEL "Go Up"
RUN ATOM="Right Arm", State="Lift-up"
LET S = Status, Atom="Right Arm"
TEST S, "IDLE"
BRANCH IF Not Equal, -2
'
'Before trying to go down:
'Ensure that left arm is waiting after going up!
LET S = Status, Atom="Left Arm"
TEST S, "IDLE"
BRANCH IF Not Equal, -2
LET T = State, Atom="Left Arm"
TEST T, "Lift-up"
BRANCH IF Not Equal, -5
'
LABEL "Go Down"
RUN ATOM="Right Arm", State="Drop-down"
LET S = Status, Atom="Right Arm"
TEST S, "IDLE"
BRANCH IF Not Equal, -2
'
'Before trying to go up again:
'Ensure that left arm is waiting after going down!
LET S = Status, Atom="Left Arm"
TEST S, "IDLE"
BRANCH IF Not Equal, -2
LET T = State, Atom="Left Arm"
TEST T, "Drop-down"
BRANCH IF Not Equal, -5
'
LOOP "Go Up and Down"
END
```

ROBOTIC PROCESS CONTROL SYSTEM

PRIORITY UNDER 35 U.S.C. SECTION 119(E) & 37 C.F.R. SECTION 1.78

This nonprovisional application claims priority based upon the following prior United States Provisional Patent Application entitled: Robotics System Controller Apparatus and Method, Application No. 62/456,010 filed Feb. 7, 2017, in the name of Anthony Bergman, which is hereby incorporated by reference for all purposes.

FIELD OF THE INVENTION

The present invention relates generally to a process control system, more specifically but not by way of limitation, a computer based control system configured to support and control object interactivity and communications so as facilitate creation and execution of process control of a device or plurality of devices.

BACKGROUND

Design and control of robotic systems is inherently complex. Existing methods and system for robotic process control typically require translation or compilation of visual based objects. There are approximately fifteen hundred different programming languages in the world. For those individuals that are roboticists it can be very difficult and time consuming to ascertain which languages to learn in order to accomplish their desired career objectives. Determining which computer language is the most preferred is often skew by the discipline and the desired task. Electrical engineers may have a need for command of one language but this language would not be suitable for an individual who is an industrial robotic technician. Additionally cognitive roboticists will require yet an alternate language to accomplish their desired requirements. Ultimately the programming language an individual needs to learn is dependent on what type of application is being developed and what system is being utilized.

One further problem with robotic control system is that most robot manufacturers have developed their own proprietary language. While some of these languages have foundations in conventional languages such as Pascal, an individual must still learn the nuances of the proprietary language in order to be proficient with a particular manufacturer's language.

Accordingly, there is a need for robotic process control system that includes a language that utilizes conventional written language statements such as but not limited to English which function from final creation to actual implementation. The present invention facilitates an improved design, implementation, verification and validation for a broader scope of individuals without the requirement of proficiency in a specific computer language.

SUMMARY OF THE INVENTION

It is the object of the present invention to provide a robotic process control system that is operable to control electronic hardware such as but not limited to robots wherein the robotic process control system incorporates English language statements for facilitating control of the electronic hardware.

Another object of the present invention is to provide a robotic process control system that further incorporates in the programming language thereof proprietary rules for using commands and object types so as to provide novel object interface and control capabilities to instances of the objects.

A further object of the present invention is to provide a robotic process control system that incorporates utilization of a novel group of computer programming instructions, arguments and rules for usage wherein the process control system is executed within a computer-based environment facilitating object interactivity and communications to electronic hardware.

Still another object of the present invention is to provide a process control system that includes a proprietary control language having a set of programmable object types with a unique and novel data and code structure.

An additional object of the present invention is to provide a robotic process control system that includes a set of specially designed commands and arguments for use by the code structure of the present invention within the object types.

Yet a further object of the present invention is to provide a robotic process control system wherein in the preferred embodiment the present invention is operably coupled with robot control language installed and operational on a computing device wherein the computing device includes at least one communication port such as but not limited to a USB port so as to operably coupled to an external electronic device.

Another object of the present invention is to provide a robotic process control system configured to incorporate English language statements in the programming of the present invention for use in controlling external electronic devices that includes a structured virtual environment wherein objects reside and run so as to manage interactions thereof and communications with external devices.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

FIG. 4 is an exemplary data bank layout; and FIG. 5 is an exemplary layout of an object's digitope; and FIG. 6 is an exemplary layout of an object state's digitope; and FIG. 7 is an exemplary layout of the virtual environment's digitope; FIG. 10 is an alternate diagrammatic view of a code area for an object.

DETAILED DESCRIPTION

Figure 1:
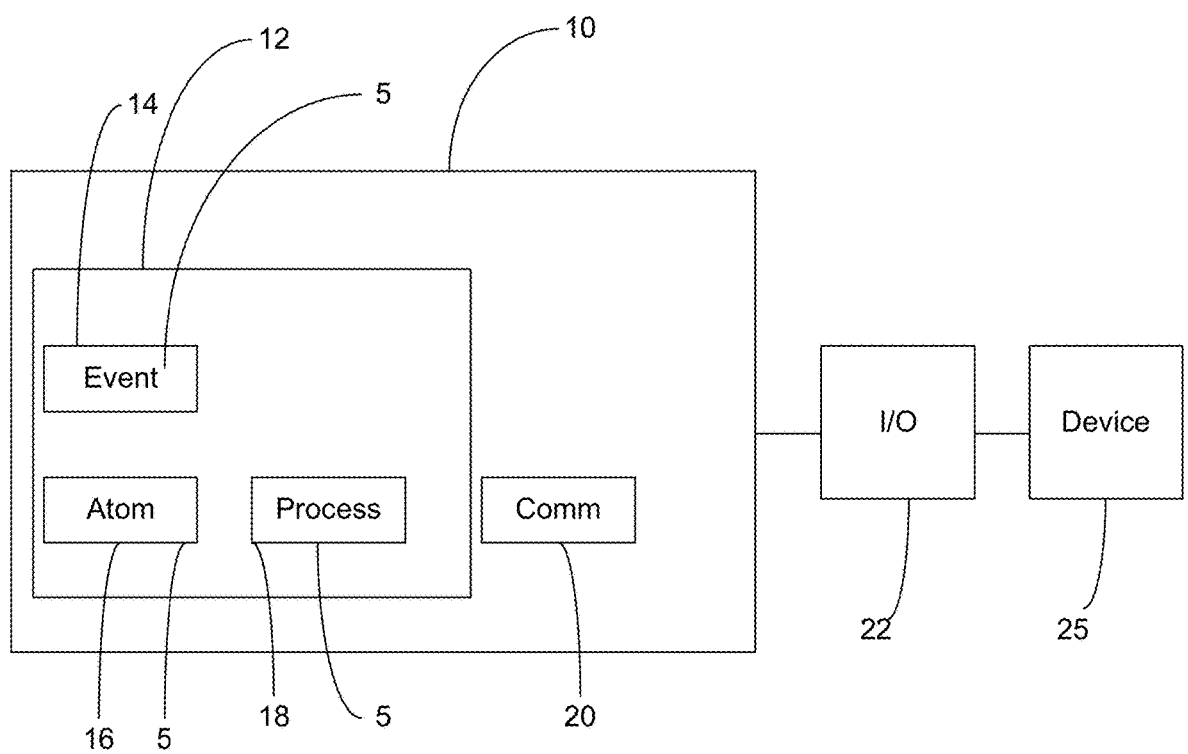
FIG. 1 is a diagrammatic view of a computing device operably coupled to an external device.

Referring now to the drawings submitted herewith, wherein various elements depicted therein are not necessarily drawn to scale and wherein through the views and figures like elements are referenced with identical reference numerals, there is illustrated a robotic process control system 100 constructed according to the principles of the present invention.

An embodiment of the present invention is discussed herein with reference to the figures submitted herewith. Those skilled in the art will understand that the detailed description herein with respect to these figures is for explanatory purposes and that it is contemplated within the scope of the present invention that alternative embodiments are plausible. By way of example but not by way of limitation, those having skill in the art in light of the present teachings of the present invention will recognize a plurality of alternate and suitable approaches dependent upon the needs of the particular application to implement the functionality of any given detail described herein, beyond that of the particular implementation choices in the embodiment described herein. Various modifications and embodiments are within the scope of the present invention.

It is to be further understood that the present invention is not limited to the particular methodology, materials, uses and applications described herein, as these may vary. Furthermore, it is also to be understood that the terminology used herein is used for the purpose of describing particular embodiments only, and is not intended to limit the scope of the present invention. It must be noted that as used herein and in the claims, the singular forms "a", "an" and "the" include the plural reference unless the context clearly dictates otherwise. Thus, for example, a reference to "an element" is a reference to one or more elements and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

References to "one embodiment", "an embodiment", "exemplary embodiments", and the like may indicate that the embodiment(s) of the invention so described may include a particular feature, structure or characteristic, but not every embodiment necessarily includes the particular feature, structure or characteristic. So as to facilitate understanding of the present invention, a definition of terms and commands are listed herein wherein these terms and commands are utilized within the scope of the present invention. The acronym PHOOSM is an abbreviation within the present invnetion and stands for Procedural Heavy Object-Oriented State Machine. The present invnetion includes a programming language that is similar to object oriented programming languages but the novelty thereof will be evident herein. Virtual Environment (VENV): A computerized environment, in this embodiment a computing device running Robotic Control Language (RCL), in which PHOOSM based programs are developed and executed. The RCL software provides this environment within the memory of the computing device for both a Development Application referred to as a RCL Developer and a Runtime Engine known as a RCL Engine. The VENV handles all communications between RCL programs and the computing device, and as such all external devices operably coupled to the computing device by providing a virtual communications path for use by all PHOOSM based programs.

Virtual Communications Path (VCOMM): In the present invention the virtual communications path is a buffered serial asynchronous communications pathway connecting the virtual environment to an external device, which is both controllable and sharable, by and within the virtual environment of the present invention. External Device: In the present invention this is all electronic devices which are external to the virtual environment. By way of example but not limitation this is an electromechanical device connected to the virtual environment via the virtual communications path. Virtual Communications Pathway: Within the scope of the present invention the virtual communications pathway is a fully buffered asynchronous I/O communications pathway between the virtual environment and an external device. The virtual communications pathway is made shareable between objects by VCOMM, and is supported by an external device via the host operating system of the computing device of the present invention hardware such as but not limited to USB, RS232/422/485 and Ethernet as "COM #: Ports". Time Sensitive: In the present invention the term time sensitive is a manner referring to either "soft or hard determinism," which is typically used when describing methods of programming time based strategies for real-time embedded computer systems.

Object: Within the scope of the present invention the term object is a similar concept to that which is used in many modern object-oriented programming languages, i.e. C++ and C #. However, within the present invention, the term object is quite different, by having both a unique and novel internal structure and external interface, both to other objects and the environment in which the object operates. Object type: In the present invention there are three types of objects defined in the PHOOSM language: 1) Process Objects, 2) Event Objects, and 3) Atom Objects. These are referred to throughout herein as: Process, Event, and Atom. Object Instance: Within the scope of the present invention an object type is used by program code within the host language, such as but not limited to RCL, to define an object, which contains both program code and data, and which initially exists within a virtual runtime environment during the execution of a certain RCL program instructions. By way of example but not limitation in RCL,"RUN Object"—where Object is either: object, atom, event, or process. Object ID: An identifying integer value, assigned by the virtual environment to an object Instance during creation of the object. System Rules: Within the scope of the present invention a set of rules governing how objects interact with VENV/VCOMM, as well as, the general parallel processing/multi-tasking abilities of objects, in addition to time sensitivity.

Data Bank: In the present invention the data bank is a data memory area such as but not limited to RAM, of an object or the VENV, which is configured as an array of a set of variables, an array of an array. Sets of variables may be selected by an integer value from 1 to X, which is called the Data Bank index in the present invention, where X is a maximum index limit that is defined by a specific implementation of RCL. Once a Data Bank Index is selected by a use data command, the data bank's set of variables is available for access until another use data command is specified. In conventional RCL, the first variable within a set of variables in a Data Bank is designated by the letter 'A' and the last variable is designated by the letter 'Z.' This is due to the fact that the English language is universally accepted for using the mathematical concept of variables. This promotes the novel usage of a digitope, defined later herein, for universal object communication. These variables may also contain an array of values of various types. Furthermore these variables may also be given a longer textual string name for ease during code development and to promote readability. Data type: Within the scope of the present invention the term data type specifies which type of Data Bank to use. There are three data types: 1) System which is a data type for use by the VENV, 2) Object which is a data type used discreetly within or between objects, and 3) State which is a data type used discreetly within a state, wherein the state is within an object.

Data stack: Each object Instance contains an internal Data Stack, which is generally similar to a memory stack utilized by most microprocessor instructions sets. As is known in the art a memory stack is a part of memory that has been set aside for Last-In-First-Out operation, i.e. the last variable directed onto the stack is the first one removed. Stacks may grow or decrease in size, usually from zero variables to some maximum limit. Further, a computing device instruction may direct the contents of a data variable onto a stack of memory, or remove those contents from the memory stack or further transfer intermediate different variables. This is useful for moving variable data between computing device registers and/or RAM-based variable locations. In the present invention PHOOSM controls any variable that is currently accessible from the currently indexed Data Bank and may be directed onto the object's data stack. Further the variable may be removed from the object's data stack. The variable may be directed into another data bank which has been switched to during operation of the present invention. An object's data stack may only be accessed by code areas within an object itself. However, an object's data stack is available to all internal object states, providing a useful method of transferring variables between all internal code areas.

The term digitope as defined within the scope of the present invention is the outermost, or lowest numbered, layer of a data bank, which is designated as Data Bank number 1 (or index #1). The digitope has at least three unique and novel features: First the digitope includes a data bank layer—or first set of variables. This breaks privacy rules in data type by providing a single shareable layer of data to other objects, states, or the virtual environment. However, all other layers are maintained as private. The first data bank layer has a predefined format, based on its origin, i.e. object, state, or system, using the data bank's set of variables to transfer specific data along to a user/owner. Subsequent access being granted to a user/owner, through leverage of the twenty six English language variable names and wherein a portion of this first data bank layer is saved in a universally readable textual format within the compiled RCL object code itself, this allows a unique process for interfacing new objects with objects created and/or used by a third party. This feature of the present invention replaces the need for the traditional requirement of creating a GUID for each object, which is what COM and DCOM requires for unknown object interfacing. Since, during program development, an RCL user can simply view the object code inside an RCL program i.e. "filename.RCL" to learn about any unknown objects inside it, by using a universal text editor. Code Area within the scope of the present invention is a portion of an object which contains RCL program instructions/commands designated within a particular labeled section, i.e. begins with one of the following: 1) Object Type "name," 2) STATE "name," or 3) LABEL "name," and ends with an RCL END command.

The term command within the scope of the present invention is similar to a keyword based programming instruction utilized by most computer languages. In the present invention, command refers to instructions and/or associated arguments for the instructions such as but not limited to command parameters, specifiers, which are defined by PHOOSM, and provided by RCL enabling both object data and code control within and/or between objects and/or the virtual environment or the virtual pathway. These are the instructions used within an object's code area. Command Status is generally having special status values and/or flags associated with their progress and/or mode. This is kept within an object, along with the object status. The term Command Rules as defined within the scope of the present invention identifies when and how commands can be utilized. Command rules are defined in the individual description for each command. Command rules cover special arguments used by a command to implement PHOOSM, as well as, details of the resulting command and/or object status. The term timeout within the scope of the present invention refers to a status condition tracked within objects to determine if a command has completed execution by running out of an available amount of time allotted in which to operate. This is specified in commands by either a "timer" or "timeout" argument. If left unspecified, the default is defined by the virtual environment, which can be but is not limited to ten seconds, or by the command itself. By way of example but not limitation, RUN OBJECT, "My_Object_1", Timeout=0, RUN OBJECT, "My_Object_2",Timer=86400. In the previous example, the first command line executes My_Object_1, but if the object is not immediately available to execute, the object will return immediately without waiting, since the timeout is set to zero seconds. However, the second command line will execute named My_Object_2 for one day's worth of seconds, before abandoning the command.

The term Object Timer within the scope of the present invention is defined wherein object Instances have at least two timers used to coordinate objects. The first timer is the timeout timer which tracks the timeout condition when running commands. The second timer is a wait timer which is an option used by some commands to tell an object how long to execute a command before exiting. The term Object State is similar to the concept of an object oriented program method, but with the added unique feature of modality, i.e. putting an object into a state both runs the code defined by that state and also places the owning object into a named "modal state." Therefore, specifying an object state requires giving the object state a textual name or identification number. The term Object Status is in addition to object state. Objects have associated therewith a special set of variable values and Boolean flags to indicate their progress and/or mode. The term Object Mode as defined within the scope of the present invention is the part of the object status. There are four modes: RUN, WAIT, IDLE, and NOT RUNNING. The term Object Owner is when an object takes over the digitope of another object the object owner owns that object until released. The object identification of the owning object is tracked by the virtual environment and is considered to be the object owner. Object Rules is subset of the system rules describing how objects may interact with themselves and each other. Specifically when dealing with: data banks, digitopes, code areas, object states, object status, and command status.

Robot Control Language (RCL) is defined within the scope of the present invention as a computer programming language designed to control objects such as but not limited to robots. In the present invention, RCL is integrated with PHOOSM. RCL is composed of two executable programs: the RCL Engine and RCL Developer. RCL Engine is the technology downloaded on a computing device, or built into a device, that runs the RCL Programs. RCL Developer is used to create and test actual RCL Programs. The RCL Engine is used in either standalone mode, within a computing device so as to provide a virtual environment to run RCL programs. In development mode, the RCL Engine runs within the separate RCL Developer program, to provide real-time development and debugging features to the user. RCL Engine uses built-in hybrid compiler/interpreter technology to ensure that the same code created in RCL Developer is run the same way in both RCL Developer and RCL Engine. The term RCL Programs is a group of RCL objects which have been compiled by RCL Developer and saved in a computer file on a host computing device using filenames with the .RCL extension. For example but not by way of limitation, the RCL Program file, Tony's_Robot_Controller.RCL contains a number processes, events, and atoms—designed by Tony, and saved as a special group, to control a robot. An RCL Program is commonly comprised of at least one process, several events, and a number of atoms. An RCL program is often self-contained, but may also rely upon using objects from third parties or user libraries by loading objects from other RCL Programs during operation. When an RCL Program is run from the operating system of the computing device of the present invention, its default is to begin running at the first process object found. By way of example but not limitation this may be overridden by using command line arguments such as, RCL_Engine Tony's_Robot_Controller or Object=Wave_Left_Arm will load an RCL Program called Tony's_Robot_Controller.RCL and begin running the object named Wave_Left_Arm.

Within the scope of the present invention there are specially designed commands and arguments for use by the code within the objects. In order to understand examples described later herein, the following command descriptions provide exemplary syntax and description for use by code areas within the scope of the present invention. The code areas, which function with the object types, including their unique code and data structures and associated relationships and rules. Although many command names may seem similar in name and function to existing computer languages, such as but not by way of limitation: LOCK, UNLOCK, DELAY, OUTPUT this is intentional for ease of use. It should be understood that within the scope of the present invention that the command terms when used in conjunction with their associated special arguments, and usage rules in accordance with the present invention, and in coordination with each other, provide the unique and novel features of the robotic process control system 100. These commands utilize special arguments to support the methodology of the present invention. Exemplary special arguments are as follows but do not intend to provide limitation thereof: Put, Get, Timeout, Yield, Wait, System, Object (or specific Object Type—Atom, Event, or Process), Object ID, Label, State, Next, Previous, System, Freeze, Status, and Result.

The special arguments, Status and Result, are similar in use to the Object Timers—Wait and Timeout, in that they can be added to certain commands to manage inter-Object coordination but conversely, they actually receive data about the target object, rather than set parameters for it.

All RCL Commands, whether or not they are incorporated into the present invention provide an error flag used to determine if a command has run correctly or has failed due to an error of some kind. This may be specified in commands by an argument of, "Okay," or "No Error;" or conversely, "Not Okay," or "Error." For example, the Command line: "BRANCH IF Not Okay, Retry" will go to the label named "Retry" if the error flag is set as a result of previous command. The specific condition flags of the present invention such as but not by way of limitation, "Timeout" and "No Access" may be set as a result of trying to run a command with a target object, and therefore are checked often when programming a fault-tolerant/aware robotic system for production. For example, the command line: "BRANCH IF No Access, Retry" will go to the label named "Retry" if the No Access flag is set as a result of a previous command. It should understood by those skilled in the art that the commands are capitalized for clarity but do not need to be capitalized in practice. Commands may be a single or a group of words and may be followed by one or more arguments. Optional arguments are written within parenthesis while required arguments are written outside of parenthesis. Additional exemplary command syntax examples are a comma prefix means that if the argument is not the very first argument after the command name, it should be preceded by a comma, for example, Object="name") is an optional argument and should be preceded by a comma unless it is the first argument. Variables are specified using the capital letter V, which represents any variable from the current set of variables (A-Z) within the currently indexed data bank, and may be one of the following types: 1) Text String, 2) Integer, or 3) Floating Point, unless specifically identified by "V.text (or V.string), V.int (or V.num), or V.float", respectively, indicating that only a specific variable type may be used. It is preferred within the scope of the present invention that literal numeric arguments are specified by the hashtag/pound symbol, "#", while literal floating point numbers are specified by two hashtags separated by a decimal point, i.e. "#.#".

It is to be understood within the scope of the present invention that an Argument of, ( . . . ) means that a previous argument format may be repeated for the next argument. However, there is a maximum of number of arguments in a command line defined by the particular implementation of RCL. A choice of an argument from multiple possible arguments is shown where each possible choice is separated by a forward slash symbol "/", i.e. Process/Atom. The exemplary argument indicates that either a process or atom can be used for that argument. An equal sign "=" is used to show separation of sub Arguments. For example but not by way of limitation; "(,System/Object/Object ID="target name"/#/V) indicates that: if the command allows for assigning a variable to one of the argument choices of system, object, or object identification, then either a literal text string ("target name"), literal number (#), or variable (V) may be used. In the present invention a condition flag means that one of the PHOOSM specific condition flags, "Timeout," "No Access," "Data Locked," "Data Owned," "Code Locked," "Comm Locked," can be used at that argument position. Commands that cause a change in where code execution takes place, can be suffixed with an "IF Condition Flag". The IF condition flag is not the first argument, but rather an extension of the command name itself. For example, but not by way of limitation; "END IF Timeout" will only execute the END Command if the Timeout flag is set wherein "Timeout" is considered to be the first Argument in the line. Additionally, A vertical line character, "|", means that a space character is required between the previous and next possible text. For example, if the optional argument is specified as "(,Previous|Label/Code Area)" then one of the following can be used, 1) "Previous Label", or 2) "Previous Code Area".

The following is an explanation of the command descriptions utilized within the scope of the present invention. The following are exemplary and are not intended to be limiting. Run Command Syntax: RUN (IF Condition Flag) Object/Object ID="target object name"/V (,Label/State="label or state name"/V) (,Wait=V/#) (,New ID=V) (,Put=V(,V) ( . . . )) (,Get=V(,V)( . . . )) (,Timeout=V/#). Alternate run command syntax:RUN APP "path_filename_args" (,Timeout=V/#) (,Wait=V/#) (,Status=V) (,Result=V) (,Foreground) (,Background). The run command transfers execution to the code area at either the label within the current object or at the state name within another object. The condition flag argument is only present for "RUN IF" and will only execute the run command if the specified RCL/PHOOSM Condition Flag is true. When a target object is used, the run command waits for that target object to enter into a status mode of wait or idle and have its code area unlocked before returning. However, after these conditions are met, and if a state is also specified, the run command continues to wait for the target object to enter into that state before returning. This novel operation provides for automatic object coordination. The run command relies upon the concept of implicit lock, explicit unlock, and the timers. The wait command sets the amount of time the target object is allowed to run without allowing interruption. For example, if the target object does not set a status mode of idle or wait and it does not clear the code locked flag within the wait time period, it will allow run to continue once the wait period has expired. If a wait command isn't specified, the target object will not return unless the target object explicitly permits. The run command does not establish digitope ownership of a target object. The run command does not set the data locked flag thus allowing code areas to be invoked by multiple objects, unless overridden by the lock or use data commands.

A further example of a run command in the present invention is as follows. If "RUN Object ID=V" is used, the desired target object must already exist. If multiple Instances of the same object already exist, this selects which one to use. While "New ID=V" creates a new Instance of the object and returns the newly created object identification, since object identifications are established during execution of the run command. If neither of these two optional arguments are specified, then the run command finds the first created Instance of the target object name and execute. If a target object name cannot be found, a new Instance is created and executed. For a run object command, a target object must be specified, in which case, for the optional put and get arguments: "Put=V" puts the variable contents into the corresponding variable, i.e. C to C, or E to E, of the digitope of the target object, from the currently used set of variables. The optional get argument "Get=V" returns the variable contents from the corresponding variable of the digitope of the target object, when the run command returns from the object. For the run command "Label=", a target object is optional and when no target object is specified, then argument Put=V puts the variable contents into the corresponding variable, i.e. C to C, or E to E of a set of variables which are considered private to that labeled code area. The argument Get=V retrieves the data from a label's private set of variables and copies the data to the corresponding variable of the caller, once the label reaches a corresponding end command. Execution then continues back at the next command line. The aforementioned is because, when any label is executed by a run command, the target object creates a new set of variables which are considered temporary and recursive, allowing a label to be run from its own code area.

For the run command "Label=", when a target object is specified, then the operation is the same as for "no target Object" except that the following inter-object arguments are also available: Timeout and New ID. Only the atom object type may be used as a target object when running a label. As with running a local label, the run command will not return until the label reaches a corresponding end command. This is different from running a remote state, since a state can return prior to END. This allows a "Get=V" argument to properly receive final results from a label within a target object. The run command "State=", or if neither label nor state is specified, a target object must be specified, in which case, operation is similar to "RUN Label=", except that a state does not setup a private and recursive set of variables, but rather uses the digitope of the target object for the arguments, put and get. Another run command, RUN APP, creates an attempt to have the host operating system run the named application program. The "path_filename_args" should be the actual URL or pathname and filename and any arguments. The timeout command operates as described herein. The wait command operates by allowing the target program to run for a period of time before having the operating system terminate the command. Status specifies a variable that will be continuously updated with information about the runtime of the program. It may be one of the following integer values: 0 for "Not yet running;" >=1 for "Running, with some # seconds remaining to run; −1 for "User exited or Wait time ran out", −2 for "Timeout occurred;" and −3 for "System error or user aborted." Result specifies a variable, which will contain an integer value returned by the program to the OS when it terminates. Background and foreground tells the operating system to run the program in a multitasking mode.

It is contemplated within the scope of the present invention that a run command never accesses a state's digitope, only a target object's digitope, since a state's digitope is only available to other states within an object itself. Furthermore, if the target object is a process or an event, the run command forces commencement of execution from the beginning of its first code area. If the target object is an atom, and no target state is specified or the atom has not yet been run, then the operation is the same. Once a target object is up and running, the run command does not successfully return from waiting for a target object until that object has a status mode of wait or idle and is code unlocked. This typically occurs when the target object reaches an end command, but may also be forced by the target object itself using the unlock and delay commands. In the present invention, atom objects are designed to exist over periods of time and be changed from state to state by other objects. Therefore, if a target state is specified and the target atom is already running, the first code area will not be rerun, instead, the run command will wait for the target atom to have a status mode of wait or idle and flag of code unlocked. Thenceforth continue to wait for the target atom to enter the target state before returning. However, the target object does not need to perform any additional unlock or delay commands to allow run to return, since the run command is now merely waiting for the target state to be entered before returning.

An additional command utilized within the scope of the present invention is the label command. An exemplary label command syntax is as follows: Syntax: LABEL/:/PROCESS/EVENT/ATOM/STATE "name". The label commands are all considered as labels defining a named point in a code area where execution may begin or be transferred. This name may be used by the run, branch, change state, and end commands. When a labeled line is executed, the code locked flag is automatically set to on to help enforce the concept of implicit lock. The state command line defines the beginning of an object state, which may be run from another object or switched to from within the same object. An object may not use the run Command for a state within its own code area, only for states within another object. However, a change state command may be used to switch between its own states.

Another command utilized within the scope of the present invention is an end command. Exemplary syntax of an end command is as follows: END (IF Condition Flag) (,Next/Previous|Label/Code/Code Area/Line) (,"label name"/V/#). The end command is used to indicate the end of a code area, as well as, put the object into an idle mode, which allows the object to be put into another state. The condition flag argument is only present when an "IF" is present immediately after "END", i.e. "END IF No Access, Next Label" will: test the condition flag "No Access", and if true, will momentarily set an idle mode and then begin execution at the next label command defined in the code area. Yet another command utilized in the present invention is a change command. An exemplary syntax of the change command is as follows: CHANGE STATE (IF Condition Flag) "state name". The change command is used to transfer code execution from the current line to the line labeled "state name" within the current object. The change command is similar to standard RCL 1.XX branch command. However, with PHOOSM, the change command also changes the current state data bank to the target state's data bank, as well as, the object's status concerning state.

Still another command utilized within the scope of the present invention is the use data command. Exemplary syntax for the use data command is as follows. For Objects: USE DATA (V/#) (,Mine/Previous/Object/Object ID="target object name"/V) (,State="state name"/V) (,Timeout=V/#). Syntax for use data commands with the virtual environment is USE DATA V/# (,System) (,Freeze=V/#) (,Timeout=V/#).The use data command is used to gain access to another object's digitope, or to the virtual environments' system data bank. The Argument "V/#" is an integer variable or number ranging from one a maximum limit, which specifies which layer of a data bank to use. This works for the object's own data bank ("Mine" option) or the virtual environment data bank but not for other objects. Alternate objects can only share their digitope. The term, system, specifies accessing the virtual environment's data bank rather than an object's. If no optional arguments are specified, then this is the default mode. If the term, freeze, is also specified, it tells the virtual environment, once data bank access has been granted, to block system data bank write access by all objects, except for the calling object until a programmed amount of time has passed. This provides a method of sharing sets of variables, in global data, between objects, without having to take over other objects. Although digitope control is preferable for more mature systems, freeze does allow for rapid prototyping using shared variables. The term, Mine, means to use a data bank within the object itself. The term, previous, means to switch data bank access to the previously used data bank, not the currently accessed one. A syntax of: Object/Object ID" (i.e. Object="object name" or Object ID=V) specifies to use the digitope of a target object for example, USE DATA Atom="Left Arm" or USE DATA Object ID=V). The term, state, specifies using a target state name within the object itself since state digitopes may only be shared within the same object. The use data command provides an internal lock data command on the target object, before setting the current object as the data owner of the target object. If unable to do so, the use data command sets the no access flag and returns to the next command line. If the lock is successful, the data bank will remain locked until an unlock data command is used, by either the same calling object or by the target object itself. A lock data command is attempted when the target is the system data bank. This provides for the free exchange of global data. Therefore, the virtual environment actively prevents data collisions, guaranteeing that two separate data writes don't occur simultaneously. Once a target object has a data owner variable and data locked flag established, the target object may continue to modify its own data. However, the data owner object also has data read and write access to the digitope of the target object, while the virtual environment prevents data collisions.

Still an additional command within the scope of the present invention is a move data command. An exemplary syntax for the move data command is MOVE DATA System/Object/Object ID="target object name"/V (,Put=V(,V) ( . . . )) (,Get=V(,V)( . . . )) (,Timeout=V/#). The move data command is used to transfer data between variables between objects, or between an object and the system data bank. The move data command uses the currently selected data bank as either the source or target object for the transfer of variable data, depending upon the transfer direction. By way of example but not limitation, a put argument transfers from the current data bank to the digitope of the target object, while a get argument transfers data from the digitope of the target object to the current data bank. When the put argument is used, this command tries an internal lock data command on the target object, before attempting to transfer data. The target object is unlocked again once the transfer is complete, unless the target object was already in a data locked condition from a previous command, in which case the target object is left in the data locked condition. When the get argument is used, there is no attempt to lock Data on the target object. If the target object is not already in a data locked condition, the data is transferred and the code area moves on to the next command, else the command returns with a "no access" flag condition. This means that an object can lock its own digitope to prevent other objects from accessing the object, which is a form of self-induced privacy. Further, one object cannot access the digitope of a target object if the target object is already data locked by another object until it is released.

An alternate command utilized within the scope of the present invention is a let command. Exemplary syntax for the let command of the present invention is as follows: LET V=State/Status/Data Owner/Data Bank/Data Type/Condition Flag (,Object/Object ID="target object name"/V) (,Timeout=V/#). Common RCL languages have a generic version of a let command, which allows assigning one or more variables to another, either mathematically or logically. This is also true of RCL. C Language variants have an implied LET invoked when an algebraic expression is used, i.e. "C=A+B" implies "LET C=A+B". In order to support PHOOSM, the present invention differs in that an addition of the following special cases (via arguments) is a variable from the current set of variables within the currently used (indexed) data bank. State is returned for the target object, or if no target is specified, the state of the current object is returned. Status is returned for the target object in the variable as one of the following strings: "not running, run, wait, or idle". If no target object is specified, then the current object's status is returned as run. If V is an integer variable, rather than a string variable (i.e. V.int), the status is returned as one of the following numeric values: 0 (for not running), 1 (run), 2 (wait), and 3 (idle). When a data owner is specified, the object identification of the owning object is returned (in V.int) as an integer. When data bank is specified, the integer value of the currently indexed data bank is returned (in V.int) as >=1, where 1 always represents a digitope. When the data type is specified, a text string describing the type is returned (in V.string) as follows: "process, event, atom, state, or system". When a condition flag is specified (i.e. LET V=Condition Flag); for integers (i.e. V.int), its value is converted to a 0 (for false) or a 1 (for true); but, for strings (i.e. V.string), its value is converted to the text of "false" or "true". PHOOSM specific condition flags, which are an extension of standard RCL condition flags, are: code locked, data locked, data owned, comm locked, timeout, and no access. If a target object is specified, then the timeout argument may also be used. Timeout sets the amount of seconds allowed for the target object to respond before a timeout flag occurs and the command returns. If timeout is not specified, the default system timeout is utilized.

Still a further command of the present invention is a lock command. An exemplary syntax of the lock command of the present invention is as follows: Lock Code/Data/Comm (,On/Off). The lock command used to establish the condition of resource availability to objects running within the virtual environment. The lock code specifies that code execution will be in a locked condition ("code locked" flag is set [or true]), effectively preventing another object from changing its code execution to different code line (state or label). This remains in effect until an unlock code, end, or stop command is utilized. The lock data command sets the digitope of the current object to a locked condition ("data locked" flag is set). This is not used to take over another object's digitope. To access and lock a different object's digitope, a use data command is utilized. A data locked condition remains in effect until an unlock data or stop command is utlizied, but a data locked command is not affected by the end Command. This allows an object to be in idle mode while still being owned by another object. By way of example but not limitation, a master object can take over a target object's digitope with use data, and then, when the target object reaches an end command, the master object remains the data owner. A lock comm command specifies that the currently selected VCOMM asynchronous I/O pathway is locked for use by the calling object. This prevents other Objects from using that VCOMM pathway during the locked condition ("comm locked" flag is set). This will remain in effect until an unlock comm, end, or stop command. This argument also allows an additional optional argument of on or off, which permits the caller to prevent other objects from locking or unlocking the currently selected communication pathway.

Yet another command utilized within the scope of the present invention is a unlock command. The exemplary syntax for the unlock command within the scope of the present invention is: Unlock Code/Data/Comm (,Object/ Object ID="target object name"/V) (,Timeout=V/#). This command used to establish the condition of resource availability to objects running within the virtual environment. The unlock command performs the reverse of the lock command, by unlocking the associated object or VCOMM status flags. If the unlock data command has one of the object arguments (i.e. Object="name" or Object ID=V) then the unlock data command will unlock the digitope of the target object when the current object is the actual data owner of the target object.

An alternative command utilized within the present invention is the delay command. Exemplary syntax of the delay command is as follows: Delay V/#/#.# (,Yield/No Yield). The delay command is utilized to force the current object—the owner of the executing code area, to pause a certain amount of time before continuing on to the next line of code. The mandatory first Argument specifies the # Seconds to pause. It may be specified by a variable (V [V.int or V.float]) an integer (#), or floating point number (#.#). The optional argument specifies whether or not the current object should yield to other objects in the virtual environment. Therefore, during the time period, if the yield argument is in effect, then this command keeps the current object in the status mode of wait until the time period expires, or until another object causes code execution to change. If the yield argument is not in effect, the current object does not go to wait mode, meaning that while another object may be waiting for the current object to return from a run command, the current object will not return during the delay time period unless the yield argument is in effect. The aforementioned is very important in time-coordinated robotic systems. In PHOOSM, when combined with the unlock command, this allows simultaneous coordinated multi-tasking of objects. By default, if left unspecified, the yield command is assumed by the delay command for all integer values (i.e. 1, 3, 5, etc.), but not for floating point values (i.e. 0.25, 0.125, etc.). This is because, in real-time systems, fractional delays are usually based on hardware or communications requirements, whereas time measured in seconds is usually more human interface based.

A further command in the present invention is the boost command. Exemplary syntax of the boost command is: BOOST On/Off. The boost command activates or deactivates a boost mode for the current object. Boost mode is a condition where the virtual environment uses a high speed method for executing object code areas, rather than the default normal mode. Command line execution for normal mode, is as follows: one command line from each object type is executed before moving to the next command line. This provides a preemptive style multitasking baseline within PHOOSM. However, there are times when rapid execution is desirable within a code area, for example while in a tight loop which is looking for certain input from a sensor or when performing math operations on a shared variable. Usually, in a case like this, there are parts of the loop which must not be interrupted by other objects which may themselves interfere with either I/O or timing, yet there are also parts which aren't as critical. The boost command provides a solution by forcing the virtual environment to maintain execution of the current object without switching away until released. The normal mode is reinstated, and boost mode is released, via the end command. The boost mode is temporarily disabled during the execution of one of the following commands: delay, input, or output. This is desirable since these commands spend some time waiting. However, when one of these commands returns, the boost mode is reinstated.

An additional command within the scope of the present invention is the Use Comm command. Exemplary syntax of the Use Comm command is, USE COMM V/# (,Close/ Speed=V/#) (Timeout=V/#). The Use Comm Command prepares, or opens a computers communication port for use by objects running in the virtual environment and selects the communication port for use by all following data I/O commands. For user readable textual data, the default data mode is via bytes using the ASCII character set. For raw data transmission, the default is bytes with the appropriate number of data bits, and start, stop, and parity bits as specified by the associated operating system device driver. Objects access the virtual communication path using the same basic concepts as when accessing other objects, by using an implicit lock, explicit unlock, and timers. However, coordinating multiple objects' usage of virtual communications path is much simpler than that of objects to objects, since an object may simply select a virtual communications pathway by using a number from one to two hundred and fifty-five. The mandatory first argument (V/#) specifies the VCOMM Pathway number to use for future input, output, lock, or unlock commands, which access VCOMM via the comm argument. This is the same number as used by the operating system for the corresponding COM #: provided by the computer hardware. For Example: "USE COMM 1, Speed=115200" means: open "COM1:" as VCOMM Pathway 1, using the current device driver settings from the operating system, device drivers and hardware; and then, set the transmission speed to a desired bits per second. The close argument releases all VENV/VCOMM control, over the selected and already opened VCOMM Pathway.

An alternate command within the scope of the present invention is an output command. An exemplary syntax of the output command is: Output "user text"/#/V ( . . . ) (,Forced) (,Insert) (,Timeout=V/#). The output command is used to send user controlled data to the currently selected virtual communications pathway. Multiple groups of literal text, numbers, or variables can be sent to the virtual communications pathway. Another command utilized within the scope of the present invention is the input command. An exemplary syntax of the input command is: INPUT V (,Timeout=V/#). The input command is used to receive data from the currently selected virtual communications pathway. By way of example but not limitation: "INPUT V will attempt to receive a line of data from the current pathway. A line of data is determined by the setup of the associated device driver. It is usually defined by an inter-byte delay time used within the operating system or hardware, or by being terminated by an ASCII Carriage Return character.

Still a further command utilized within the scope of the present invention is the load code command. Exemplary syntax of the command is: LOAD CODE "filename"/V. The load command is used to dynamically load other RCL based program files into the currently executing virtual environment. This allows dynamic real-time programming changes to be made to running RCL Programs. If the load code argument has an extension of .RCL, then the command is considered to be a program, which has been compiled by the RCL Developer. If is an ASCII based text file (i.e. ends with ".TXT" or ".CSV", etc.), then the virtual environment will attempt to load it as a source file version of an RCL Program, since the RCL Engine is able to run these files.

Another command utilized within the scope of the present invention is the find object command. An exemplary syntax of the find object command is: Find Object (,Type=Object Type/V) (,Name="object name"/V) (,Group="group name"/V) (,File="file name"/V) (,Home="file name"/V) (,URL="internet link"/V) (,Title="description") Object ID=V Result=V (,Next/First/Last). The find object command searches the virtual environment for objects and their instances. Object identification specifies the integer variable used to return the actual object identification of an Instance. If an RCL Program defines an object, and it has been loaded into the virtual environment, but no Instances have yet been created for it, then this returns a zero. Result specifies the variable to return with an integer value for information about the object as follows: "<0" means the Object does not exist in the VENV—even as an RCL Program; "0" means that RCL Program code does exist for the Object but no Instances are yet running; ">0" represents the number of Instances of the target Object presently running in the VENV. If one or more of the optional arguments, "Type/Name/Group/File/Home/URL/Title" are used, then these are combined to narrow down the selection of potential target objects. Next, specifies to find the next object identification from more than one Instance if multiple Instances were found in the previous use of this command; whereas, "first" gets the first instance, and "last" gets the very last instance created in the virtual environment.

An alternate command within the scope of the present invention is the share command. Alternate exemplary syntax is as follows: SHARE Title/URL="user text"/V (,Line=#/V) (,Publish) or SHARE Type/Name/Group/File/Home/ States="user text"/V (,On/Off) (,Publish) and SHARE Security/Features/Variables="user text"/V (,Publish). The share command determines which fields to make available to other objects in the virtual environment. The publish argument instructs the RCL developer to create ASCII text versions of the shared fields and collate them all from all publishable objects) at the top of the ".RCL" program, so that they may be read via a text editor. For either title or URL, this command tells an object to share the specified user text or the contents of V as ASCII text in the digitope of the object itself. For Title: if no line argument is specified, then user text is copied over the very last possible variable for titles in the digitope, which is the variable named "T". Otherwise, if line evaluates to "1", then "T" is used, then "2=S", "3=R", and "4=Q", for a maximum of four title lines. For URL: during the development of an object's code area, the user may desire to link this particular object with an RCL Internet authority to control groups of predefined and published RCL Objects. This connection may be established with the URL Argument, which points to one of many potential RCL Internet authorities on the Internet. The user is responsible for obtaining permission, from the RCL Internet authority, to use the actual object with whatever requirements they have for, type, Group, and Name fields. When publishing RCL Programs for use by unknown third-parties, using the title is a technique of giving a short title and description of states and labels and required variables for usage. Using the share command and find object is a novel replacement for the current method of generating and using GUID's for shared objects via existing COM/DCOM technology. When compiling an RCL Program, RCL Developer automatically generates most of the last part of an object's digitope, including the: type, name, group, file, home, and states fields. This may be controlled and/or overridden by using the on/off arguments for specific fields.

A further command utilized within the scope of present invention is the push command. Exemplary syntax for the push command is: PUSH V (,V) ( . . . ). The push command places the contents of one or more variables, from the currently selected data bank, on to the top of the current object's LIFO data stack. Variables are pushed, in order, from left to right; so that, the rightmost variable ends up being the topmost on the stack. Another command deployed within the scope of the present invention is the pop command. Exemplary syntax of the pop command is: POP V (,V) ( . . . ). The pop command pulls the contents of one or more variables, from the top of the current object's LIFO data stack, to the currently selected data bank. Variables are popped off, in order, from left to right, so that; the rightmost variable ends up being the last variable pulled off of the Stack. This means that, to reverse this line: "PUSH a, b, c"; requires this line: "POP c, b, a". An additional command is a stop command. The stop command removes the current Instance of an object from the virtual environment. The stop command is called from within the code area of an instance of an object, when said object wishes to remove itself from the system. The stop command automatically releases any memory based arrays which may have been created during the execution thereof. The stop command also releases any resources it may have taken ownership of within the virtual environment.

A uniquely structured virtual environment in which object instances reside and run, and which manages their interactions, as well as, their communications with external devices via a unique virtual communications path, is described as follows: The virtual environment is a program execution environment which is a section of the host computing device's memory running a special task manager (RCL Engine), and works in conjunction with the host operating system to provide RCL PHOOSM support by hosting and managing: 1) execution of object code areas, 2) data banks and its digitope, and 3) the virtual communications path. The virtual environments execution of object code area is accomplished in a time sensitive manner. Each code line within an object's code area is executed one line after another until a corresponding end command is reached. At that point, the corresponding object will simply remain at that line in the object mode of idle. A unique and novel aspect of PHOOSM code execution is that computing device time is shared between objects multitasking in both a preemptive and cooperative manner. This is because the virtual environment executes one command from each object type, atoms, events, and then processes before moving to the next command. This is the preemptive part, and it is the default behavior of the present invention. However, an object can override this behavior by using the commands boost, lock code, unlock code, and delay, to provide cooperative multitasking. The virtual environment also manages the object timers keeping them updated correctly and coordinated between objects, virtual communication pathway and the operating system of the computing device. The virtual environment manages the data banks of all objects and their states, as well as, a common system data bank to share between the virtual environment and among the objects themselves. As related to the digitope, this system data bank shares only its first layer of variables with the host environment, which in this case is the operating system itself. This allows the operating system to provide values for the first part of the digitope, as well as, static information about the operating system and external devices, to objects within the virtual environment. This maintains digitope consistency throughout PHOOSM. The virtual environment also manages object access to data banks by ensuring that no write data collisions occur. In other words, if an object is updating the digitope of a target object, the virtual environment ensures that the target object does not update its own digitope at the exact same time which would cause an undefined value to be placed in a variable. This also holds true if two objects are trying to update a common system data bank in the virtual environment itself. The virtual environment manages the virtual communications path, which connects the virtual environment to the external devices. Virtual communication pathways provide a shared communications pathway for objects to exchange data with hardware. When the virtual environment first runs an object command which requires access to a virtual communications pathway, it looks for an available com port on a computing device, i.e. COM1 as provided by the operating system's device drivers. When found, the virtual environment assigns the com port to the virtual communications pathway which then sets up the com port for use as a fully buffered asynchronous I/O communications pathway with special characteristics. One of these characteristics is the ability to share between Objects data inputs/outputs with hardware. Another is to provide FIFO buffered data with buffer override data insertion capabilities. In the aforementioned embodiment of PHOOSM, the Virtual Environment is within a Windows™ based computer, connected to external devices via a USB port, and running RCL version 2.0. The Windows™ operating system provides access to a connected USB port driver, which, in turn, provides universal support to the virtual environment for translating USB commands and data to and from a format, which the hardware can understand and respond to correctly. The hardware utilized in this exemplary embodiment can be either an Ontrak 2010 DIO board, or a Velleman VM167 using Ontrak style I/O Driver software provided by MSI. This, in turn, is connected to actual motors and transducers to implement robotic arms.

Referring to FIG. 1 herein, the robotic process control system 100 includes at least one computing device 10 wherein the computing device 10 includes the necessary electronics to store, receive, transmit and manipulate data. In the preferred embodiment of the present invention the computing device 10 is a computer having an operating system configured to run PHOOSM based RCL programs so as to control and/or manipulate external hardware 25. The software of the present invention provides a virtual environment 12 that is hosted in the memory of the computing device 10. The virtual environment 12 controls all of the communication between the software of the present invention, the computing device 10 and the external device 25. The virtual environment 12 further hosts the objects 5. As is discussed herein there are three object types within the present invention. Object types include an event object 14, an atom object 16 and a process object 18. The computing device 10 includes a communications interface 20 that is configured to utilize a suitable protocol to facilitate communication between the computing device 10 and the communications control board 22. The communications control board 22 is a conventional electronic communications interface that facilitates communication between the external hardware 25 and the computing device 10. It should be understood within the scope of the present invention that the external hardware 25 could be numerous types of electronic hardware that is configured with the necessary electronics to store, receive, transmit and manipulate data. By way of example but not limitation, the external hardware 25 could be robotic hardware.

The virtual environment 12 hosted in the computing device 10 utilizing the software of the present invention utilizes PHOOSM to host object types and run their instances. Further, the software and PHOOSM manage the interactions intermediate the object types, as well as, manage the object's communications with the external device 25 via the communications interface. The objects 5 are based on three novel object types; process, event and atom, each having a unique internal code and data structure. Specifically designed commands and arguments, discussed herein, are provided for use by the code within objects. Special rules apply when using these commands and object types, which together provides novel object interface and control capabilities to instances of the object types. The commands and arguments defined and discussed herein are used by instances of the three object types and are implemented within the virtual environment 12 of the computing device 12. The goal of the PHOOSM methodology is control of robotic hardware, represented by the objects and as such the PHOOSM-based objects 5 will contain an amount of conditional logic used to control an object based on the condition of one or more other objects. This is managed by having RCL utilize the PHOOSM-specific commands and arguments within the standard conditional logic structures provided by a modern computer programming language.

Figure 2:
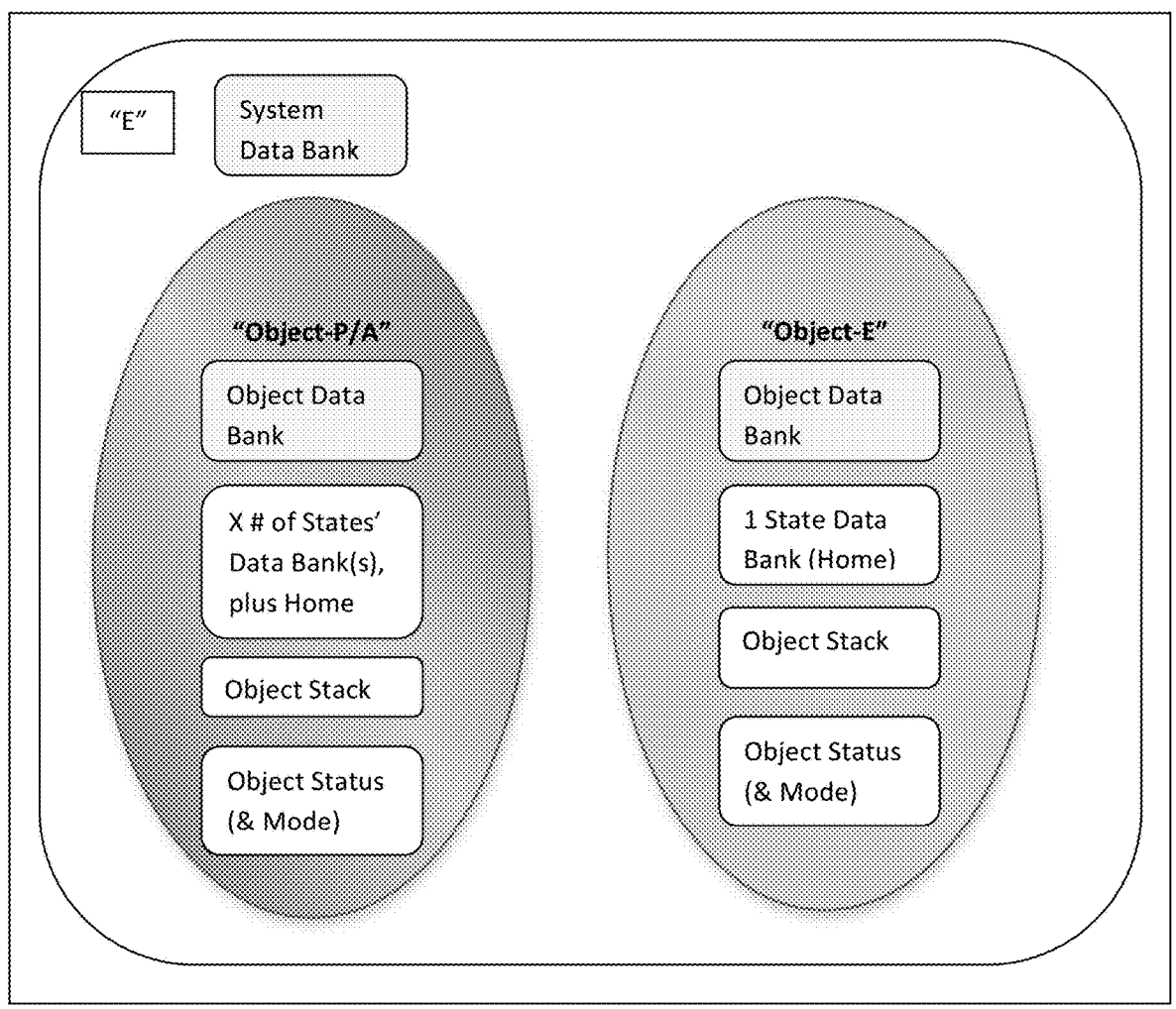
FIG. 2 is a diagrammatic view of a memory layout for a virtual environment of the present invention.
Figure 3:
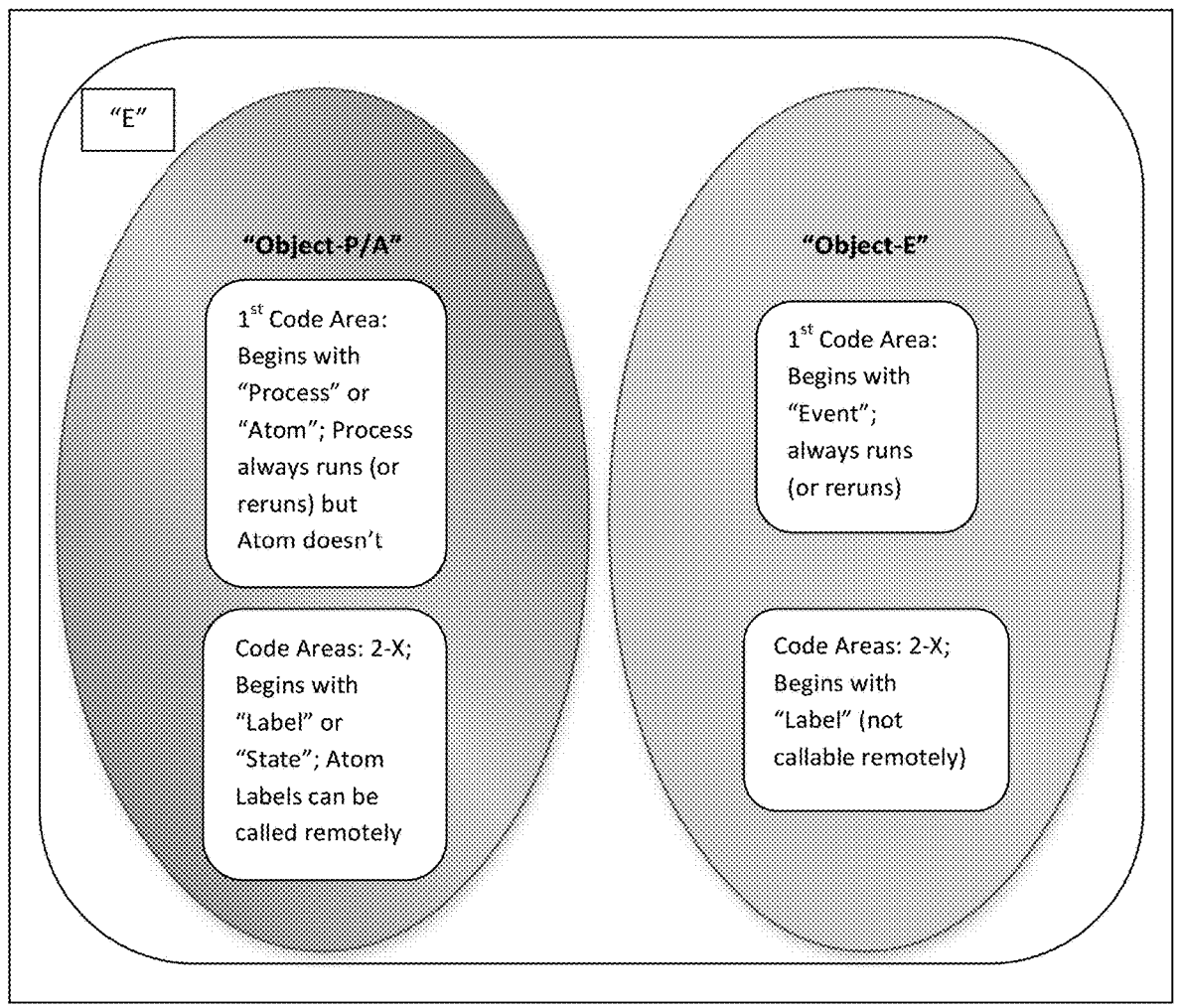
FIG. 3 is a diagrammatic view of an internal code layout for the virtual environment of the present invention.

As discussed herein there are three types of objects 5; the atom object 16, event object 14 and process object 20. The internal layout, for both the memory and code, of the objects 5 is shown in FIG. 2 and FIG. 3 submitted as a part hereof. All objects 5 have at least one object state, which is implicitly defined and called the home state. An instance of any object 5 has the following features: 1) at least one code area, 2) a data bank, 3) a data stack, and 4) an object status. The code area contains commands and command status. There is an internal data bank within each object 5 itself, as well as, an additional data bank for each object state defined within the object 5. Any set of variables within an object's data bank may be shared by any code area within the same object 5 itself. However, within an object 5, only one specific part of a data bank may be shared between objects 5 which is referred to in the present invention as the digitope.

As discussed herein, the robotic process control system 100 includes a system data bank, provided by the virtual environment 12 that is accessible by all objects 5. Objects may access any part of the system data bank not just its digitope, since in maintaining the concept of a digitope, the system data bank's digitope is provided as a layer for sharing with programs outside of the virtual environment via the operating system of the computing device 10. The digitope's format is shown in FIG. 5 herein for objects, in FIG. 6 for states, and in FIG. 7 for the system. The format of the digitope diagrammed in the aforementioned figures stipulates that the first part of all digitopes beginning with the letter variable A, is the area in which general purpose variable data is passed between objects and within objects for states. By way of example but not limitation the variables A and B can be used to specify how many seconds to display two different colors on a display screen, while variable C can be used to indicate if the user aborted the display early by returning the number of seconds remaining before cancellation of the task. The digitope format of the present invention also stipulates that the last part of all digitopes provide static information to other objects or states. In an object's digitope, the variables W, X, Y, and Z, respectively, contain the object's filename. For example, "Tony's_Robot_Controller.RCL", Group Name (i.e. "Arm_Controls"), Actual Name (i.e. "Wave Left Arm"), and Type (i.e. "EVENT") in a textual format ('C' Language style string).

The last part of a digitope is considered static, since the variables are assigned once by the virtual environment at Instance creation, and they may be overridden and used for general purposes by the user during an object's instance, as they will not be updated during usage. A state's digitope is laid out as follows: the variable X contains the name of the last state which was changed from in order to enter into the state; the Y contains the name of the state which was changed to from this state the last time it was exited; and the Z contains the current name of the state itself. Since static, these variables are fully usable within the state, and are only updated by the virtual environment once the state's digitope is released or switched away. The system data bank in the virtual environment is for sharing between objects. The system data bank's digitope is currently laid out as follows: the variable V contains the current RCL version #, W contains the operating system, X contains the operating system name, Y contains the calling user's permission level value (i.e. 0=Admin, 1+=Level), and Z contains the DATE/TIME (in Julian format) when execution began. The last parts of the system data bank's digitopes may be updated to convey other useful data in future versions. However, the last part of a digitope is used to convey static information about its origin or states: prior condition, to a user.

A state's data bank may only share its digitope with other states provided more than one state exists within the object. The state's data bank may not share other indexed variable layers, i.e. 2–X and the state's data bank may not share its digitope with any other object. The object status is a special set of variable values and flags, which indicate progress and/or mode. Within the object status are the following: 1) object mode, 2) object state, 3) object owner, and 4) the three primary status flags: "data locked", "code locked", and "data owned". There are two additional status flags used by commands for coordinating objects: 1) "timeout", and 2) "no access".

There are four object modes: run, wait, idle, and not running. Run means the object is executing commands in a code area. Wait means the object is either waiting for time to pass via a delay command or waiting for data transfer using a virtual communications pathway. Idle means that the object reached an end command and is idling there in its last object state. Not running mode means the object is not running. One object may check the status of another object by accessing its object status. In RCL, the let command has specific arguments for this purpose. If the target object is already owned by another object or its digitope is locked, the inquiring object may not access the object state and object owner status variables. The object state is a named code area beginning with a state label code line and continuing until another state label is defined. During runtime, a new state is not actually activated until either a Change State (="name") command is run within the object, or a Run Object, State="name" command is run by another object. The object owner is established when another object issues a use data command to take ownership of a target object's digitope, in which case the object owner in the target object becomes the object identification of the calling object, otherwise it is zero for un-owned. The three primary status flags, data locked, code locked, and data owned, are either set or reset, as a result of commands, including, but not limited to: unlock data, unlock code, lock data, lock code, and use data. Use data first attempts a lock data command and then tries to establish an object owner. The two additional status flags used by commands in coordinating objects are used in a code area to determine if there was a failure in gaining access to a target object's code area or digitope due to either: running out of time—via the timeout flag, or the object being unavailable for other reasons, i.e. not having an Instance running, or being locked via the no access flag.

Figure 8:
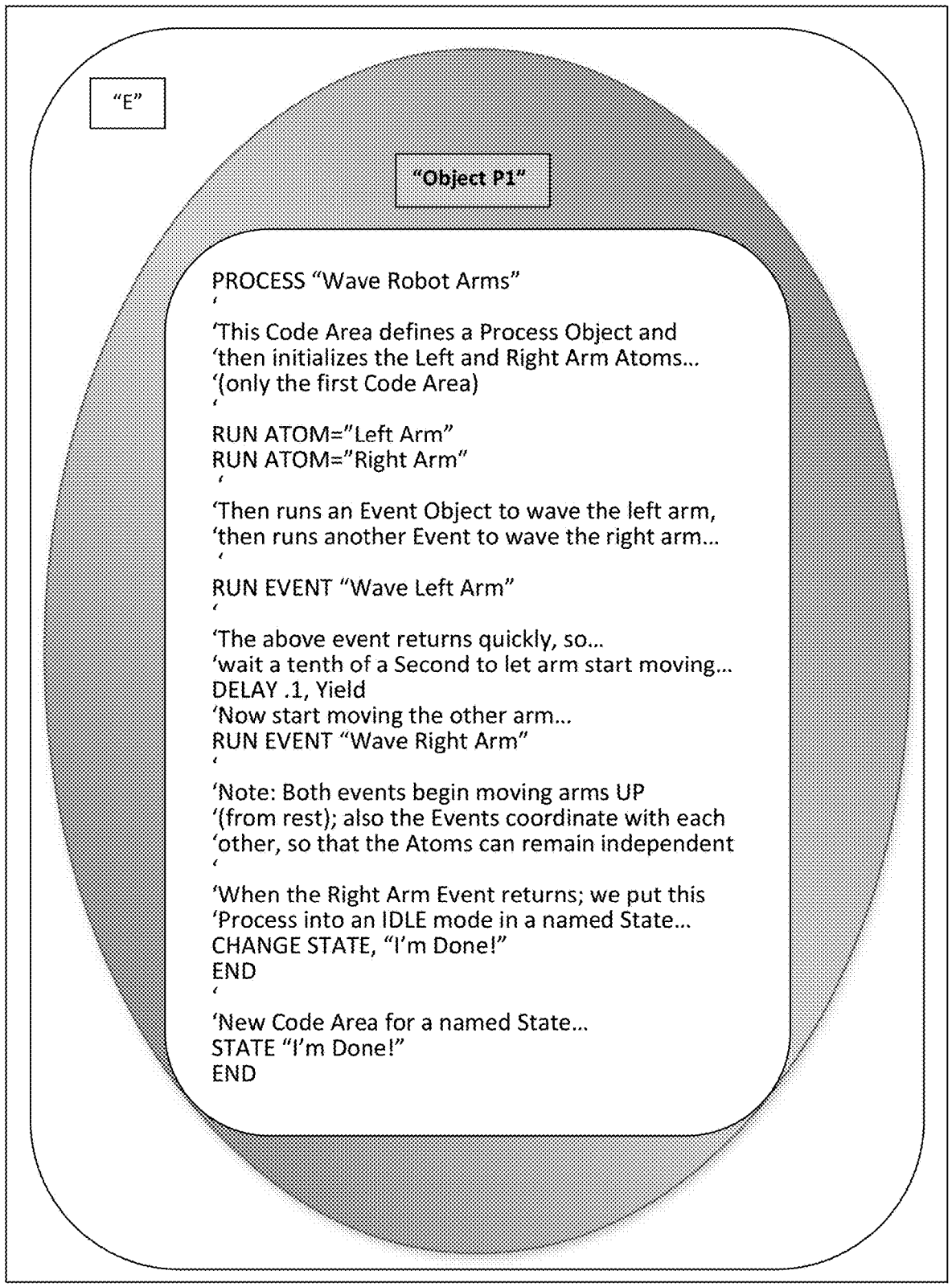
FIG. 8 is a diagrammatic view of a code area for an object.
Figure 9:
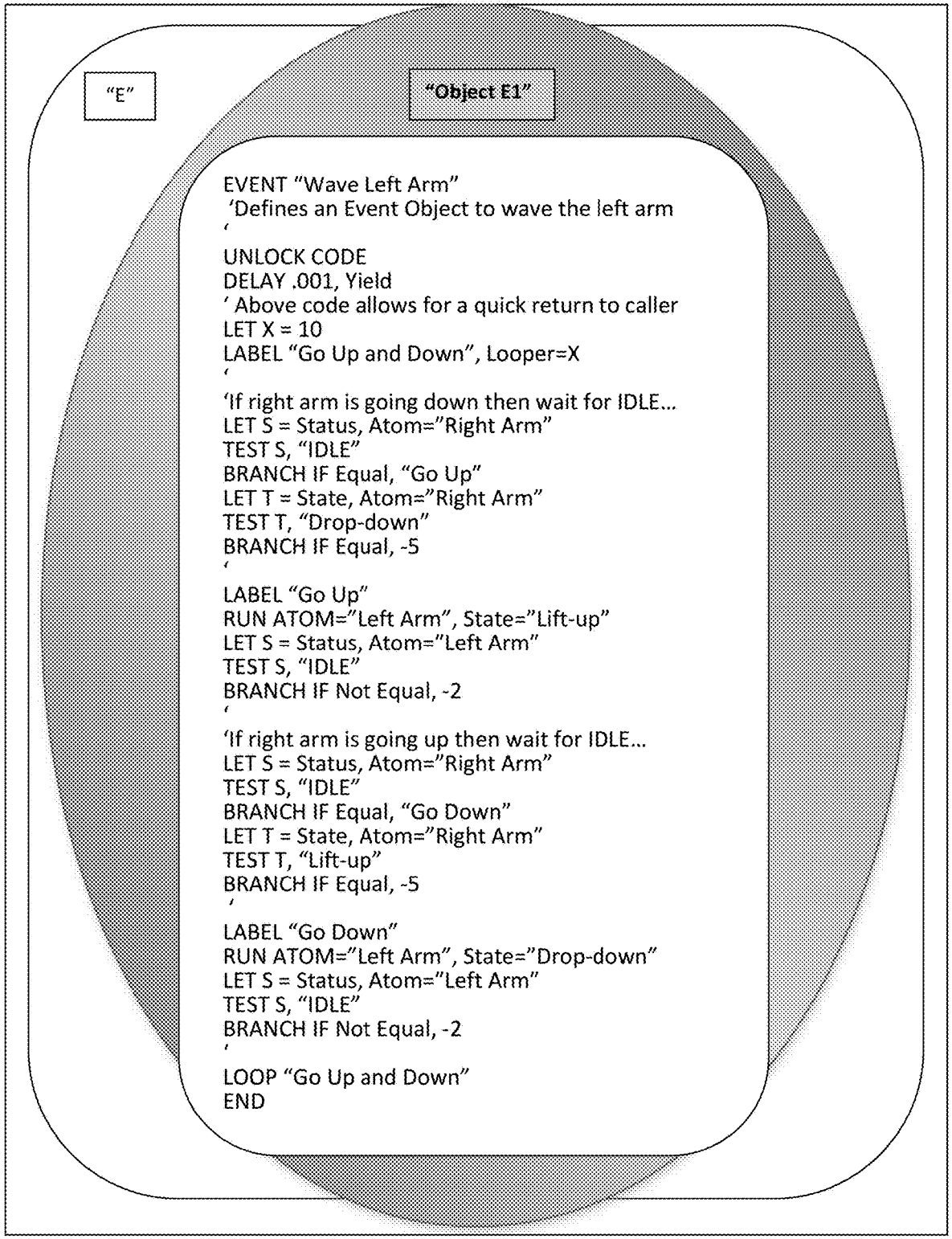
FIG. 9 is an alternate diagrammatic view of a code area for an object.
Figure 11:
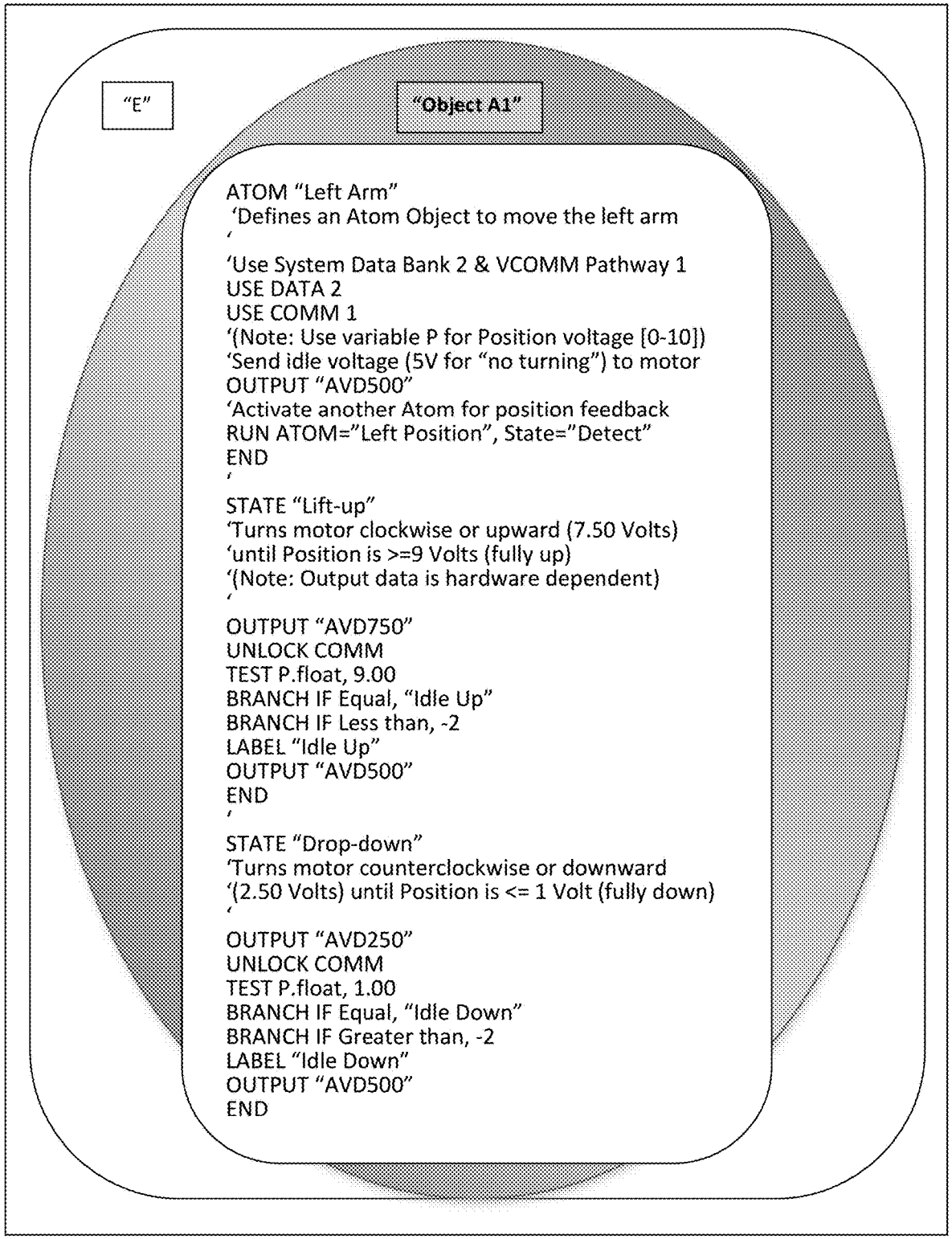
FIG. 11 is an alternate diagrammatic view of a code area for an object.
Figure 12:
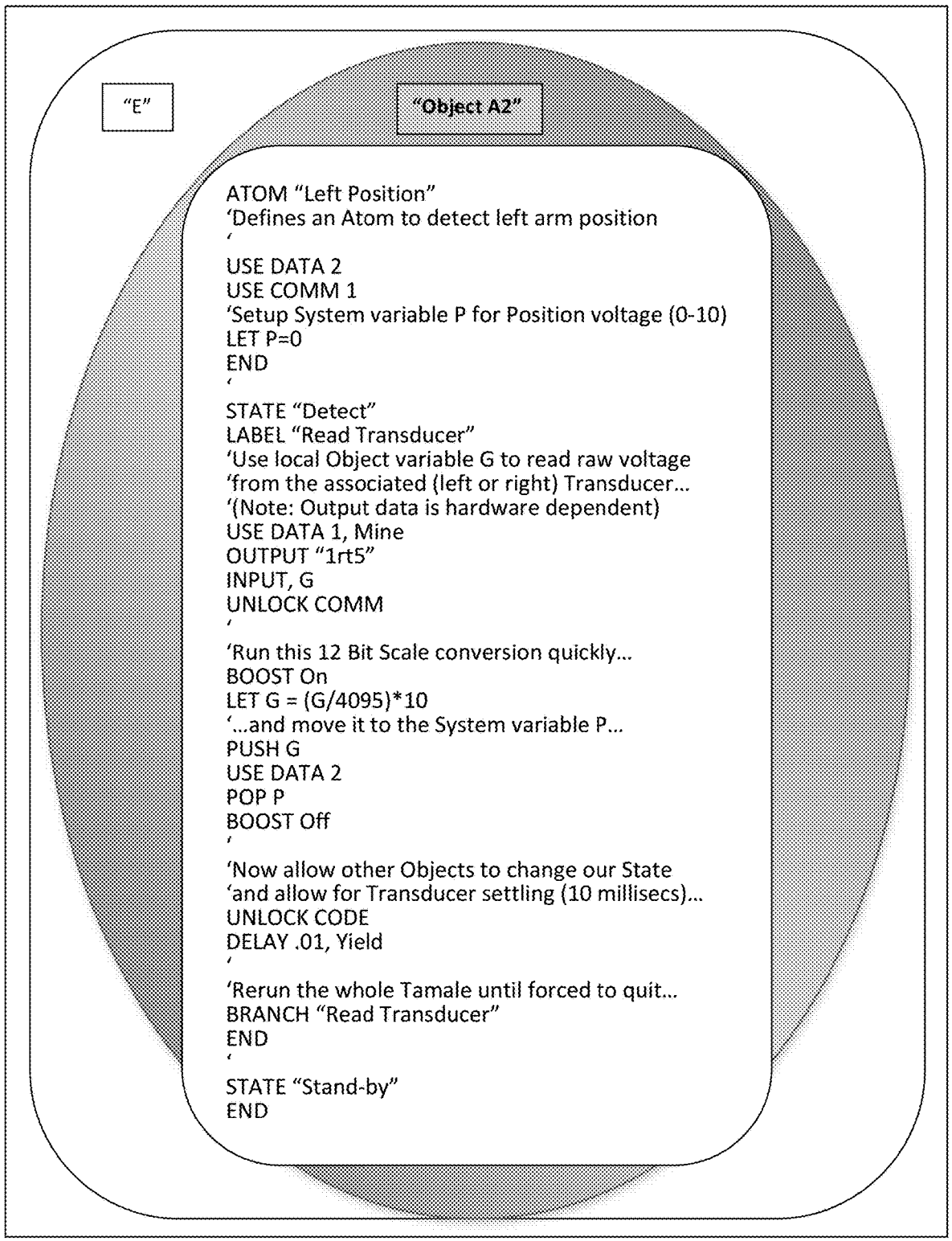
FIG. 12 is an alternate diagrammatic view of a code area for an object.

The three object types have features which make them unique from one another. The object type of process run from the beginning of the very first code area through to an end command. Process object types always have at least one State which is home, automatically defined by the system. Process object types may have additional object states defined after an end command which may be switched to by a change state command or run by another object after the first code area has finished running. This is diagrammed herein in FIG. 8. Event object types run from the beginning of the very first code area through to an end command. Event object types have only one object state which is the home state that is automatically defined by the system, so a user should not use the state label to create a new state, or try to change state. This is diagrammed herein in FIGS. 9 and 10. Atom object types when run for the very first time at Object Instance creation, run from the beginning of the first code area through to an end command. Atom object types always have at least one state, which is home that is automatically defined by the system. Atom object types may have additional states defined after an end command which may be switched to within the atom object type by a change state command or run by another object at any time after the initial run. This is diagrammed herein in FIGS. 11 and 12.

Unlike a process object type, an atom object type can be made to change states by another object without having to rerun the first code area. This is very useful when providing essential low level services to other objects, so an atom object type can be run once to setup some variables and then moved from one state to another during its handling of the variables to provide easily documented and understood control abilities to the entire virtual environment. PHOOSM provides some novel and efficient object coordination techniques. Object coordination is handled by managing three main areas: 1) the code area, 2) the digitope, and 3) object timers. When coordinating code areas, a calling object, by default, automatically waits for a target object to reach its end command and continue to run the target state's code area until its end command before continuing to the next command. This default logic can be altered by the target object using the delay and unlock code commands. The reason is that most versions of run object, before returning and continuing to the next command, wait for the target object to go to an object status of code unlocked and an object mode equal to either wait or idle. Therefore, the target object can execute an unlock code command followed by a delay command in order to override this default behavior and return to the caller before reaching an end command.

The present invention leverages PHOOSM object coordination, which is a three part concept of: 1) Implicit Command Lock, 2) Explicit Command Unlock, and 3) primary Object Timers of Timeout or Wait. Implicit command lock means that a command which tries to access another object or the virtual communications pathway will automatically attempt a lock data and/or lock code depending upon context, before executing its primary functions. For example but not by way of limitation, the command, use data, first attempts a lock data on a target object's digitope, before establishing itself as the object owner of that object. Explicit command unlock means that a code area must explicitly unlock its own digitope or code area, or those of a target object if it wants to allow other objects to have access to those areas. The role of the digitope in coordinating objects is in sharing variables between objects and/or the virtual environment. An object can access another object's digitope, or the system data bank, via the command use data. Once an object has successfully completed a use data command, the object then becomes the object owner of the target object. This updates the object status of the target object with the data owned flag, along with an object owner set to the object identification of the calling object. In summary, an object's status is composed of the following PHOOOSM specific flags and variables which are used to coordinate objects. Data Locked (flag), Code Locked (flag), Data Owned (flag associated with the Object Owner), Timeout (flag), No Access (flag), Object Owner (variable—Object ID), Object Mode (variable—RUN, WAIT, IDLE, or NOT RUNNING), Object State (HOME, etc.), Timeout Timer (integer variable), and Wait Timer (integer variable). In addition to these, there is also a flag which can be tested by objects, and is made available by the VCOMM: "Comm Locked" can be used to determine if the currently selected COMM line is unavailable.

Figure 13:
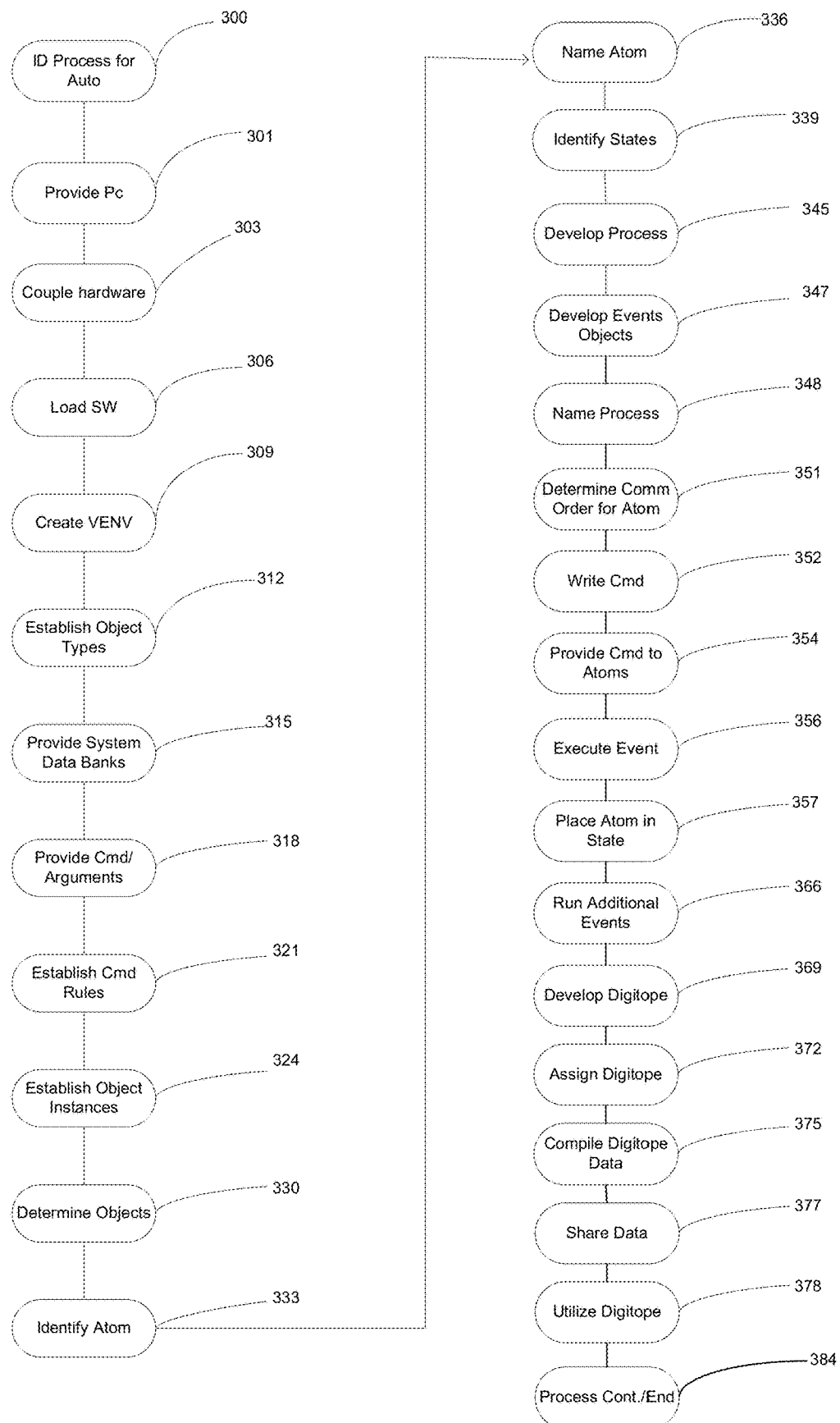
FIG. 13 is a flowchart of an exemplary process facilitated by the system present invention.

Referring in particular to FIG. 13 herein, there is illustrated therein a flowchart outlining a process facilitated by the robotic process control system 100. Step 300 begins wherein a user of the robotic process control system 100 identifies a process or at least one external device for which a user desires to apply automation control thereof. In step 301, a computing device 10 is provided wherein the computing device 10 includes the necessary electronics to store, receive, manipulate and transmit data. Step 303, the computing device 10 is operably coupled to at least one external hardware 25. It should be understood within the scope of the present invention that the robotic process control system 100 could have more than one external device 25 wherein the robotic process control system 100 is operable to transition the external device 25 from a first state to at least one additional state as discussed herein. The external device 25 is operably coupled to the computing device 10 utilizing conventional input/output communication boards or other suitable techniques. In step 306 the software of the present invention is loaded onto the computing device 10. Step 309, the software of the present invention creates a virtual environment wherein the PHOOSM based programs are developed and executed. In step 312, a user of the robotic process control system 100 will identify and establish object types. As discussed herein, the object types in the present invention are defined as events, atoms or a process. Step 315, the robotic process control system 100 provides a system data bank. The system data bank is provided by the virtual environment and is operable to facilitate sharing of data variables between all objects identified within the process of the robotic process control system 100. All of the identified objects within the present invention can access the data variables stored within the system data bank. In step 318, within the software of the present invention a plurality of commands and arguments are provided in order to facilitate the programming of the robotic process control system 100. Step 321, the software of the present invention has an established command rule hierarchy that dictates interaction between the various commands of the software of the present invention. In step 324, the object instances are established. Object instances have at least two timers to coordinate objects. Within the scope of the present invention a timeout timer and a wait timer are utilized to instruct an object how long to execute a command. In step 330, the objects within the process being automated by the robotic process control system 100 are determined. The present invention examines the spatial relationships between all of the objects and categorizes the objects into three types that have been discussed herein, process, event and atom.

In step 333, at least one atom object is identified wherein the atom is an element of the external device 25 or is the entire external device 25 itself. By way of example but not limitation, if the external device 25 is a robot of human form an atom object could be defined as the left arm of the robot. In step 336, the identified atom object is assigned a name.

Step 339, object states are identified. Within the scope of the present invention object states features modality which, means that placing an object into a state both runs the code defined by that state and places the object into a named modal state. In step 345, the process objects are developed by the user of the robotic process control system 100. In step 347, the user of the robotic process control system 100 will develop event objects wherein the event objects are the actionable objects that will constitute an action on or of an atom object. By way of contextual example, if a coffee cup has been defined as an atom object then an event object could be grabbing the coffee cup. Step 348, the developed process object is assigned a name. In step 351, the communication order is determined for each of the identified atom objects. Step 352, a user of the robotic process control system 100 will write desired commands for each identified object. Step 354, the software of the present invention executes the programmed commands so as to provide control of the external device 25. Step 356, the software of the present invention will execute the event objects programmed therein. In step 357, as a result of the executed commands the external device 25 is transitioned from a first state to a second state. It should be understood within the scope of the present invention that the external device could have more than just a first state and a second state and the term state as related to the external device 25 means a change in operation or position of an element or the entire external device 25. By way of example but not limitation, if the external device 25 is an electromechanical pump, a first state is when the pump is running and a second state could be the pump running at an alternate speed or not running.

Step 366, the identified current process of the robotic process control system 100 continues to execute additional event objects if programmed. In step 369, the software of the present invention develops at least one digitope. It should be understood within the scope of the present invention that the digitope development could occur earlier in the process of the robotic process control system 100. The placement herein in the representative flowchart of FIG. 13 is not intended to limit the sequence of operations in regards to step of digitope development. As has been discussed herein, the digitope is how objects share data. All of the objects within the present invention have data that are defined by twenty six variables. These twenty six variables are available for every object and can be shared amongst the objects within the process of the present invention. At least three of the variables of the digitope of each object provide information on location of the object, definition of the object and what the object does. Digitope data is created and stored for all of the objects, the virtual environment, data banks and object states within the present invention. In step 375, the digitope data is compiled and made available. Step 377, the digitope data is made available for sharing amongst all objects within the process of the robotic process control system 100. In Step 378, the digitope data is utilized by objects within the present invention. Step 384, the process being facilitated by the software of the present invention either continues as programmed or ends with a completion of the desired tasks.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A robotic process control system configured to provide operation of at least one electromechanical device that comprises the steps of:
    identifying an electromechanical device for automated operation;
    providing a computing device, wherein said computing device includes the necessary electronics to store, receive, transmit and manipulate data;
    coupling the electromechanical device to said computing device;
    loading software onto the computing device, said software being a robotic programming language;
    creating a virtual environment, wherein the software creates and provides a virtual environment wherein in the virtual environment control programs are developed and executed;
    determining objects within the robotic process control system, wherein the objects are classified as either atom objects, event object or process objects, said objects having at least a first state and a second state;
    providing at least one program command, wherein a user will program at least one program command wherein the program command is configured to provide an action on the objects;
    developing a process, wherein a process object is developed so as to execute the at least one command at a desired time or in a desired sequence;
    executing an event, wherein the software provides execution of the event wherein the event is an action on the objects within the robotic process control system;
    transitioning the objects from the first state to the second state;
    developing digitope data variables, wherein the digitope data variables are developed for each of the objects within the process;
    compiling the digitope data, wherein the digitope data for each object in the process is stored for subsequent access thereto;
    sharing the digitope data, wherein the digitope data is available to all objects in the process for coordination thereof;
    completing the automated operation of the at least one electromechanical device.

2. The robotic process control system as recited in claim 1, and further including the step of providing a code area, wherein the code area is a portion of the object containing the at least one program command designated within a section.

3. The robotic process control system as recited in claim 2, and further including the step of providing a data bank, said data bank being a data memory area of the object, which is configured as an array of a set of variables.

4. The robotic process control system as recited in claim 3, wherein the digitope data further includes a data bank layer, said data bank layer being a first set of variables that provides a single layer of sharable data to objects within the process.

5. The robotic process control system as recited in claim 4, and further including the step of providing program command rules, wherein the program command rules define when and how program commands can be utilized within the process.

6. The robotic process control system as recited in claim 5, wherein the at least one program command includes a state program command, said state program command operable to define the beginning on an object state which may be executed from another object in the process or within the same object in the process.

7. The robotic process control system as recited in claim 5, wherein the at least one program command includes a share program command, said program share command operable to determine which data to make available to alternate objects in the process in the virtual environment.

8. A robotic process control system configured to provide automation of a plurality of electromechanical devices comprising the steps of:
- identifying a plurality of electromechanical devices for automated operation;
- providing a computing device, wherein said computing device includes the necessary electronics to store, receive, transmit and manipulate data;
- coupling the electromechanical device to said computing device;
- loading software onto the computing device, said software being a robotic programming language;
- creating a virtual environment, wherein the software creates and provides a virtual environment, said virtual environment being where control programs are developed and executed;
- establishing object types, said objects representing the plurality of electromechanical devices in the virtual environment, wherein three object types are established and defined within the present invention, a first object type is defined as an atom object, a second object type is defined as an event object, a third object type is defined as a process object, said virtual environment configured to ascertain the spatial relationships between the three object types;
- determining objects within the robotic process control system, wherein the objects are classified as one of the three object types, said objects having at least a first state and a second state;
- providing a plurality of program commands, said plurality of program commands being English language statements utilized in a code area of the present invention, wherein a user will program a plurality of program commands wherein the plurality of program commands are configured to provide an instruction for the objects within the robotic process control system;
- identifying object states, wherein object states include modality of the object, wherein during identifying the object states a name or identification number is assigned to the object;
- developing a process, wherein a process object is developed so as to execute the plurality of program commands in a desired sequential order;
- developing event objects, wherein the event objects are developed within the virtual environment of the present invention, said event objects being configured to provide an action or instruction for at least one atom object;
- executing an event, wherein the software provides execution of an event object within the virtual environment of the present invention;
- transitioning the atom object from the first state to the second state, wherein the atom object receives instruction from the event object to transition from a first state to a second state;
- developing digitope data variables, wherein the digitope data variables are developed for each of the objects within the process, said digitope data variables providing a technique for the three object types to share data;
- compiling the digitope data, wherein the digitope data for each of the three object in the process is stored for subsequent access thereto;
- sharing the digitope data, wherein the digitope data is available to all objects in the process for coordination thereof;
- completing the automated operation of the at least one electromechanical device.

9. The robotic process control system as recited in claim 8, wherein the digitope data has a predefined format using a set of variables to provide data to a user leveraging the twenty six characters of the English alphabet.

10. The robotic process control system as recited in claim 9, wherein a portion of the digitope data is saved in a universally readable text format so as to facilitate interfacing between a newly created object with a previously created object having different creating users.

11. The robotic process control system as recited in claim 10, wherein each object type further includes an internal data bank for each object state defined for the object.

12. The robotic process control system as recited in claim 11, wherein the digitope data is provided in a predefined format, the predefined format stipulating that a first portion of the digitope data beginning with a defined variable is general purpose variable data that can be transferred intermediate all object types within the process.

13. The robotic process control system as recited in claim 12, and further including the step of providing a system data bank, said system data bank being provided by the virtual environment, said system data bank having data for sharing amongst all object types.

14. The robotic process control system as recited in claim 13, wherein the plurality of program commands includes a share program command, said program share command operable to determine which data to make available to alternate objects in the process in the virtual environment.

15. A robotic process control system configured to provide automation of a plurality of electromechanical devices comprising the steps of:
- identifying a plurality of electromechanical devices for automated operation;
- providing a computing device, wherein said computing device includes the necessary electronics to store, receive, transmit and manipulate data;
- coupling the electromechanical device to said computing device;
- loading software onto the computing device, said software being a robotic programming language;
- creating a virtual environment, wherein the software creates and provides a virtual environment, said virtual environment being where control programs are developed and executed;
- establishing object types, said objects representing the plurality of electromechanical devices in the virtual environment, wherein three object types are established and defined within the present invention, a first object type is defined as an atom object, a second object type is defined as an event object, a third object type is defined as a process object, said virtual environment configured to ascertain the spatial relationships between the three object types;

providing a system data bank, said system data bank being provided by the virtual environment, said system data bank having data for sharing amongst all object types;

determining objects within the robotic process control system, wherein the objects are classified as one of the three object types, said objects having at least a first state and a second state;

providing a plurality of program commands, said plurality of program commands being English language statements utilized in a code area of the present invention, wherein a user will program a plurality of program commands wherein the plurality of program commands are configured to provide an instruction for the objects within the robotic process control system;

identifying object states, wherein object states include modality of the object, wherein during identifying the object states a name or identification number is assigned to the object;

developing a process, wherein a process object is developed so as to execute the plurality of program commands in a desired sequential order;

developing event objects, wherein the event objects are developed within the virtual environment of the present invention, said event objects being configured to provide an action or instruction for at least one atom object;

executing an event, wherein the software provides execution of an event object within the virtual environment of the present invention;

transitioning the atom object from the first state to the second state, wherein the atom object receives instruction from the event object to transition from a first state to a second state;

developing digitope data variables, wherein the digitope data variables are developed for each of the objects within the process, said digitope data variables providing a technique for the three object types to share data, wherein a portion of the digitope data variables are saved in a universally readable text format so as to facilitate interfacing between a newly created object type with a previously created object type having different creating users;

compiling the digitope data, wherein the digitope data for each of the three object in the process is stored for subsequent access thereto, wherein the digitope data is provided in a predefined format, the predefined format stipulating that a first portion of the digitope data beginning with a defined variable is general purpose variable data that can be transferred intermediate all object types within the process;

sharing the digitope data, wherein the digitope data is available to all objects in the process for coordination thereof;

completing the automated operation of the at least one electromechanical device.

16. The robotic control process as recited in claim 15, wherein each object type further includes an internal data bank for each object state defined for the object.

17. The robotic control process as recited in claim 16, wherein the digitope data has a predefined format using a set of variables to provide data to a user leveraging the twenty six characters of the English alphabet.

18. The robotic control process as recited in claim 17, and further including the step of providing program command rules, wherein the program command rules define when and how program commands can be utilized within the process.

19. The robotic control process as recited in claim 18, wherein the plurality of program commands includes a share program command, said program share command operable to determine which data to make available to alternate objects in the process in the virtual environment.

20. The robotic control process as recited in claim 19, wherein the plurality of program commands include a state program command, said state program command operable to define the beginning of an object state which may be executed from another object in the process or within the same object in the process.

* * * * *